(No Model.)
G. A. DEUTELBECK.
SWINGING GATE.
No. 583,036. Patented May 25, 1897.
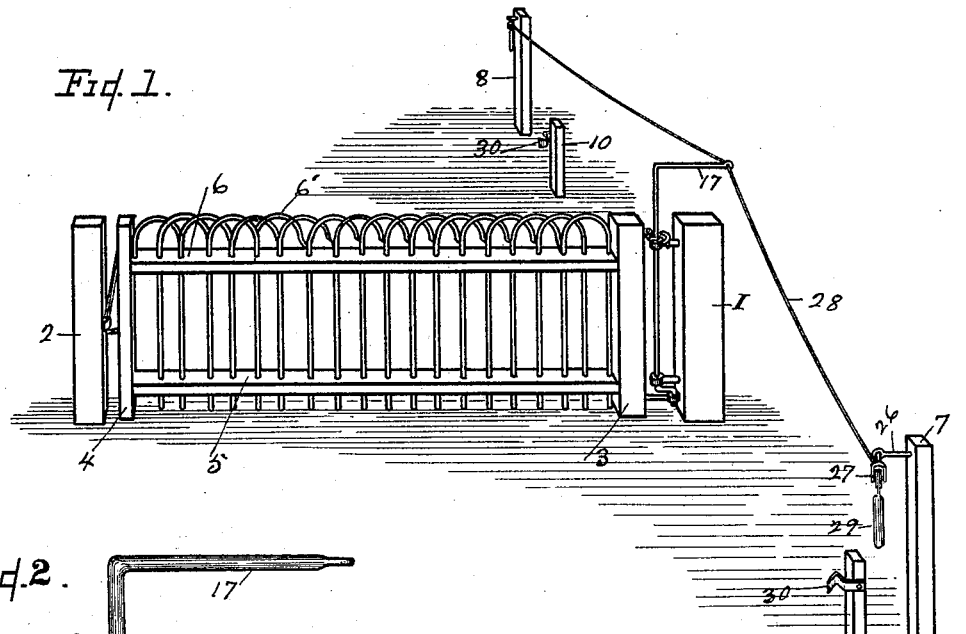
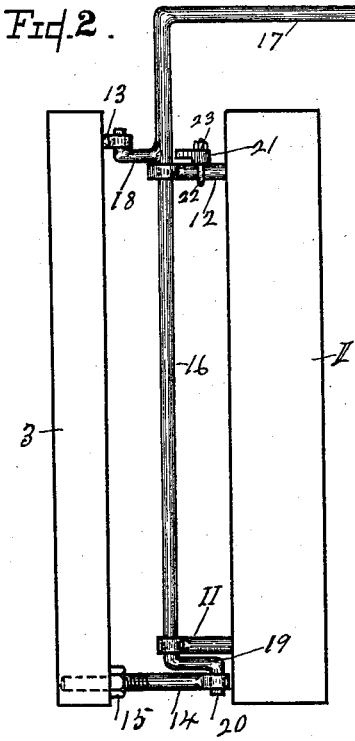
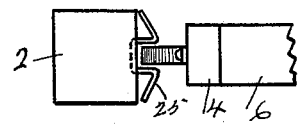
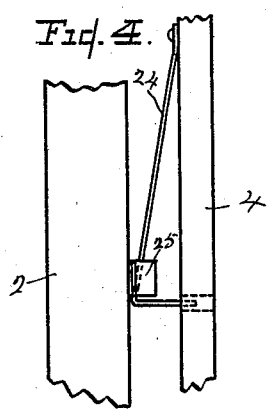
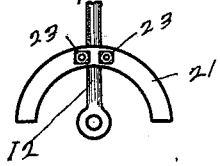
WITNESSES:
N. Webster Schlater
Minnie E. Schlater
George A. Deutelbeck INVENTOR
BY Chapin & Denny
his ATTORNEYS.

UNITED STATES PATENT OFFICE.

GEORGE A. DEUTELBECK, OF NINE MILE, INDIANA.

SWINGING GATE.

SPECIFICATION forming part of Letters Patent No. 583,036, dated May 25, 1897.

Application filed February 13, 1897. Serial No. 623,221. (No model.)

*To all whom it may concern:*

Be it known that I, GEORGE A. DEUTELBECK, a citizen of the United States, residing at Nine Mile, in the county of Allen, in the State of Indiana, have invented certain new and useful Improvements in Swinging Gates; and I do hereby declare that the following is a full, clear, and exact description of the invention, which will enable others skilled in the art to which it appertains to make and use the same, reference being had to the accompanying drawings, which form part of this specification.

My invention relates to improvements in swinging gates specially designed for farm use.

The object of my invention is to provide an improved swinging gate for farm use of cheap, simple, and substantial construction, operated by an improved hinge-rod adapted to actuate the gate by gravity, whereby the operator can open and close the gate without getting out of his wagon or getting off of a loaded vehicle.

My improvement comprises a gate of any proper construction, an operating hinge-rod pivotally mounted upon a proper supporting ground-post and adapted to so elevate the forward end of said gate and so tilt the same as to cause it to swing in either direction by gravity, a catch of novel construction which will permit the gate to open or close from either direction, and a means for actuating said rod without getting out of a vehicle in which the operator is seated.

Similar reference-numerals indicate similar parts throughout the several views, in which—

Figure 1 is a perspective view of my improved gate, showing the means for operating the same. Fig. 2 is a detail of the operating hinge-rod in position on the supporting ground-post and pivotally connected to the adjacent post of the gate-frame. Fig. 3 is a detailed plan of my improved catch in position and in engagement with the spring gate-latch. Fig. 4 is a side view of the same with the supporting parts broken away. Fig. 5 is a detail plan of the crescent-shaped buffer-plate rigidly fixed upon the upper post-hinge and adapted to limit the outward swing of the gate.

The gate shown in Fig. 1 is formed of the upright end posts 3 and 4, rigidly connected by the parallel bars 5 and 6, provided with a series of vertical perforations for the wire pickets 6', which are preferably employed as affording less resistance to the wind than the ordinary form of gate, though any proper form of gate can be employed with my invention. The upright 3 upon its outer face has the eyebolts 13 and 14 near its upper and lower ends, respectively, forming eye-hinges for said gate. The eyebolt 14 is of greater length than the eyebolt 13, extending nearly to the adjacent face of the supporting-post 1 and is secured in position by a proper holding-nut 15. In the adjacent face of said post 1, at a proper distance from the ends thereof, are rigidly secured the eyebolts or eye-hinges 11 and 12, in which the operating hinge-rod 16 is rotatably mounted. The said hinge-rod has its upper end rearwardly bent, forming a horizontal arm 17 in approximate alinement with said gate when closed, has near its upper end a short forwardly-projecting integral arm 18, having its free upturned end adapted to receive the eye of the hinge 13, and has its lower end rearwardly bent, forming a short horizontal arm 19 in approximate vertical alinement with the arm 17. The rear end of said arm 19 has a downwardly-pointing vertical extension 20, adapted to be pivotally mounted in the eye-hinge 14.

At a suitable point on the upper post-hinge 12 is rigidly fixed a crescent-shaped buffer-plate 21 by means of a clip 22 which embraces said hinge and is rigidly clamped thereon by the holding-nuts 23. The ends of this plate are adapted to limit the swing of said gate in their respective directions, which are approximately at right angles to its position when closed.

On the outer face of the gate-upright 4 is arranged an oblique spring-latch 24, having its upper end rigidly fixed thereto, and having its lower end bent inwardly to a right angle and loosely arranged in a suitable lateral slot in said upright 4, as shown in dotted outline in Fig. 4, and adapted for a limited play in said slot.

Upon the adjacent face of the latch-post 2 and in a position for a coöperative engagement with said latch is rigidly fixed the catch 25, directly opposite the lower end of said latch. The said catch is U-shaped, with its ends extended and folded back upon themselves in an oblique position to form striking-plates for the said latch upon the opposite sides of said catch, Fig. 3, adapted to force the said spring-latch inwardly in closing the gate from either direction. The said catch is preferably fixed in a proper recess in said post 2, Fig. 3.

On both sides of the ground-post 1 in alinement therewith and in a line at right angles to the closed gate are rigidly fixed in any proper manner the ground-posts 7 and 8, preferably of a greater height than that of the post 1, each having at or near the top thereof and upon its inner face a rigid arm 26, in the free end of which is suspended a proper pulley 27, on which the operating cord, rope, or cable 28 is mounted, having upon each end thereof a proper handle 29. The cord 28 is properly fixed at or near the middle of its length to the free end of the arm 17. At a proper distance from said posts 7 and 8 and in alinement therewith are arranged the posts 9 and 10, provided upon their inner faces with proper latches 30, adapted to hold the latch 24 when the said gate is open.

The mode of operation of my improved gate is briefly stated as follows: When the operator desires to open the gate, he can do so without dismounting from his vehicle, even if loaded with hay, wood, or other produce, by seizing one of the said handles 29 and pulling upon the cord 28, when the gate will open in the opposite direction. The operator can thus drive his team up to the gate from either side before pulling the cord, because the gate always opens away from and not toward the operator. This is a great convenience, as it lessens the distance at which the posts 7 and 8 must be placed from the ground-post 1.

The operation of the hinge-rod is as follows: As the short rigid or integral arm 18 of the hinge-rod, Fig. 2, projects in a direction diametrically opposite to that of the operating-arm 17, and the rigid arm 19 projects in a direction opposite to that of the said arm 18, it is obvious that pulling on the cord 28 will rotate the said rod in its bearings and draw said arm 17 toward the operator, thereby swinging the lower arm 19 toward and the arm 18 away from the operator. This action of said rod forces the lower portion of the hinged end of the gate outwardly or away from the post 1, and also swings said portion laterally in the direction of the operator, while at the same time the upper portion of the hinged end is drawn toward the post 1 and tilted or inclined away from the operator, whereby the front end of the gate is elevated sufficiently to free the latch 24 from its engagement with the catch 25, and the gate is simultaneously inclined from the perpendicular sufficiently to cause it to swing in the desired direction by gravity, and it will be temporarily secured in such position by means of the corresponding catch 30. After passing through the open gate the operator closes it by simply pulling upon the opposite handle 29, which by means of said cord 28 operates said rod, as described, thus causing the gate to swing to its closed position by gravity.

It is obvious that my improved hinge-rod may be variously modified in details of construction without departing from the spirit of my invention—as, for example, the integral arms 17, 18, and 19 may all be made detachable and secured in position by proper set-screws, and the form of latch and catch may be infinitely varied.

Having thus described my invention and the manner of operating the same, what I desire to secure by Letters Patent is—

The combination of a gate having a spring-latch 24, and a lower extended hinge adapted in conjunction with the hinge-rod to describe an arc about the supporting-hinge eye; a cooperating catch 25 adapted to form a locked engagement with said spring-latch; a vertical hinge-rod 16 mounted as shown, having an operating-arm 17, and a gate-supporting arm 18, and provided at its lower extremity with a forwardly-projecting arm whose bent free end is pivotally mounted in said hinge, whereby oscillating said rod in either direction elevates the forward end of said gate and tilts it in a direction opposite to that in which the said rod is oscillated, for the purpose specified; a buffer-plate 21 mounted as shown in operative relation to said arm 18, and means for oscillating said hinge-rod, all substantially as described.

Signed by me, at Nine Mile, Allen county, State of Indiana, this 6th day of February, A. D. 1897.

GEORGE A. DEUTELBECK.

Witnesses:
 JOHN H. DIFFENDORFER,
 GEARY S. DIFFENDORFER.